Feb. 21, 1967    P. H. PACAULT ETAL    3,304,712
STEAM AND GAS TURBINE POWER PLANT
Filed Nov. 3, 1964    5 Sheets-Sheet 3

INVENTORS
PIERRE H. PACAULT
and BERNARD CHLIQUE
BY
ATTORNEYS

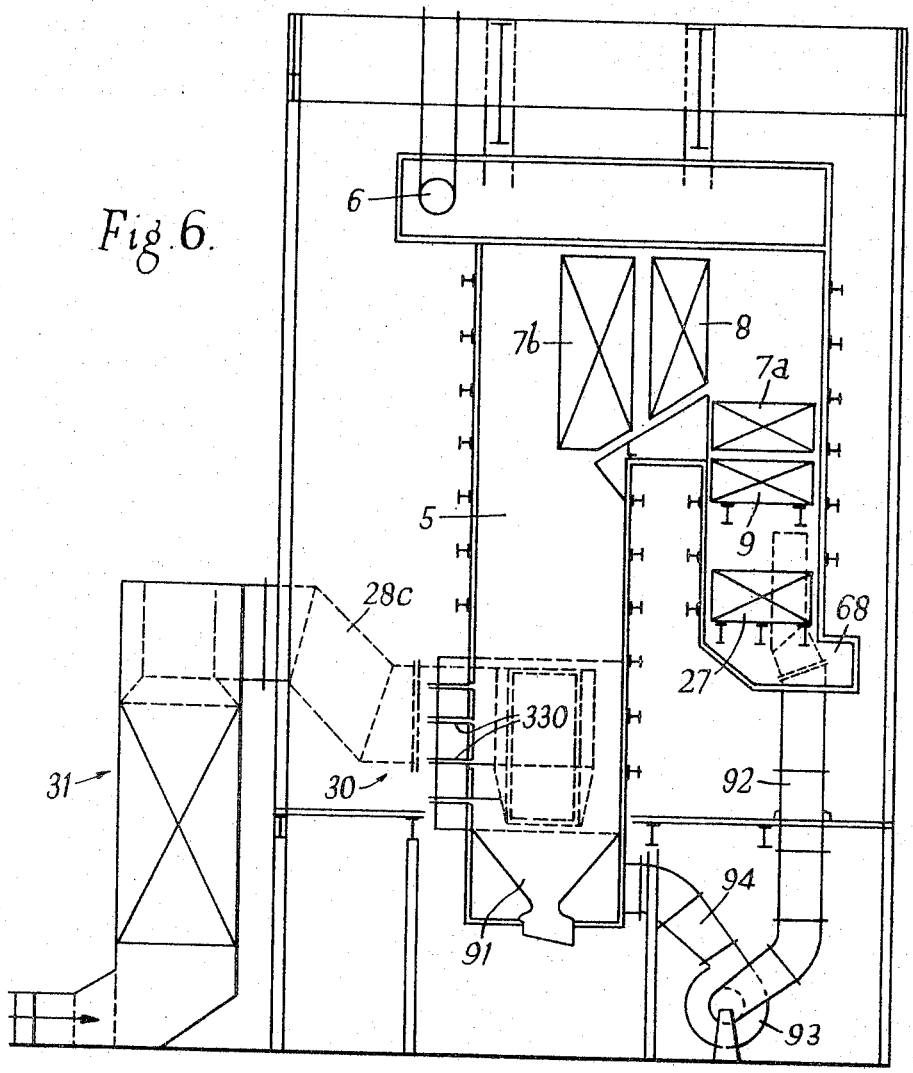

United States Patent Office 3,304,712
Patented Feb. 21, 1967

3,304,712
STEAM AND GAS TURBINE POWER PLANT
Pierre Henri Pacault, 11 Ave. Balzac, Ville de'Avray, France, and Bernard Chlique, 120 Ave. Jean-Jaures, Montrouge, France
Filed Nov. 3, 1964, Ser. No. 408,642
Claims priority, application France, Nov. 9, 1963, 953,292; Feb. 28, 1964, 965,495
17 Claims. (Cl. 60—39.18)

This invention relates to power plants comprising steam turbine means arranged to be supplied by fuel-fired steam generating units and gas turbine means for intermittently supplementing the plant power production.

The gas turbine means of such a plant may be quickly put into service when the power demanded exceeds that corresponding to the maximum desired load on the steam turbine means and associated steam generating unit. Although the combustion chamber supplying the gas turbine means is operated with a large excess of air in order that the temperature of the gaseous fluid entering the gas turbine means may be suitably limited, for example, to a maximum of about 750° C., the gaseous fluid leaving the gas turbine means has a relatively high temperature of the order of 400° C., the heat of which is in principle capable of being utilized in the plant. It has been proposed to pass the gas turbine exhaust fluid through a heat exchanger heating part of the feedwater for the steam generating unit but the heat transfer therein tends to be limited while the heat exchanger tends to be combrous and to require a large pressure drop in said exhaust gaseous fluid.

According to the present invention, gaseous fluid connecting means is provided for the use, when the gas turbine means is operated, of gaseous fluid flow from the gas turbine means to supply at least part of the oxygen required at the firing means of the steam generating unit.

In a load range, e.g. an excess or peak load range, when the gas turbine means is brought into use to an increasing extent with load the gas turbine exhaust gases increasingly supply the necessary oxygen to the said firing means and thus reduce the amount of combustion air supplied through air heating means, for example, through air heaters operating with the condensation of steam withdrawn from steam turbine stages and thus the flow of gas turbine exhaust gases usefully reduces the amount of heat required by said air heating means and advantageously the normal air compressor means may be arranged to divert air increasingly from the air heating means to the combustion chamber for the gas turbine means.

Figure 1:
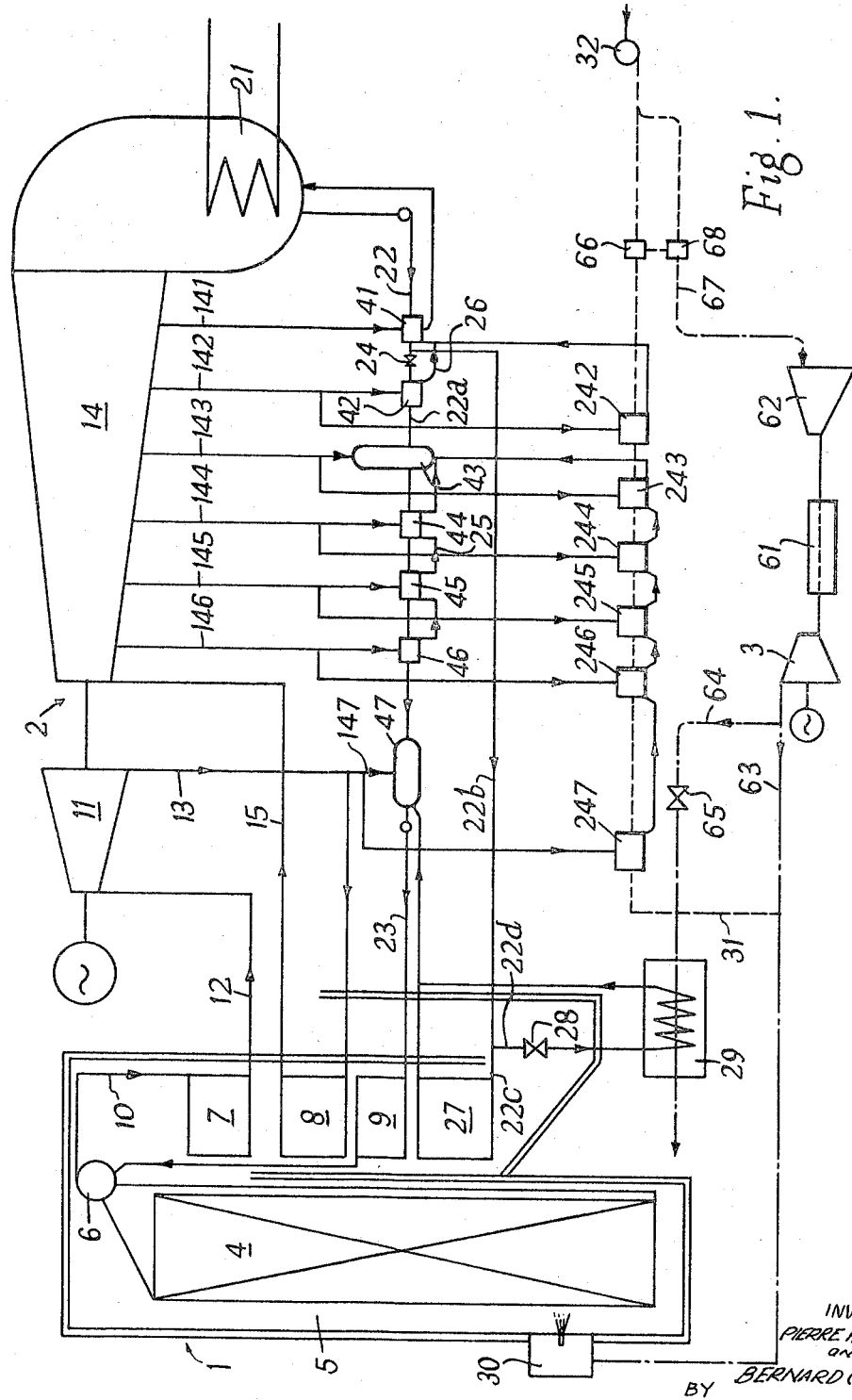
Figure 2:
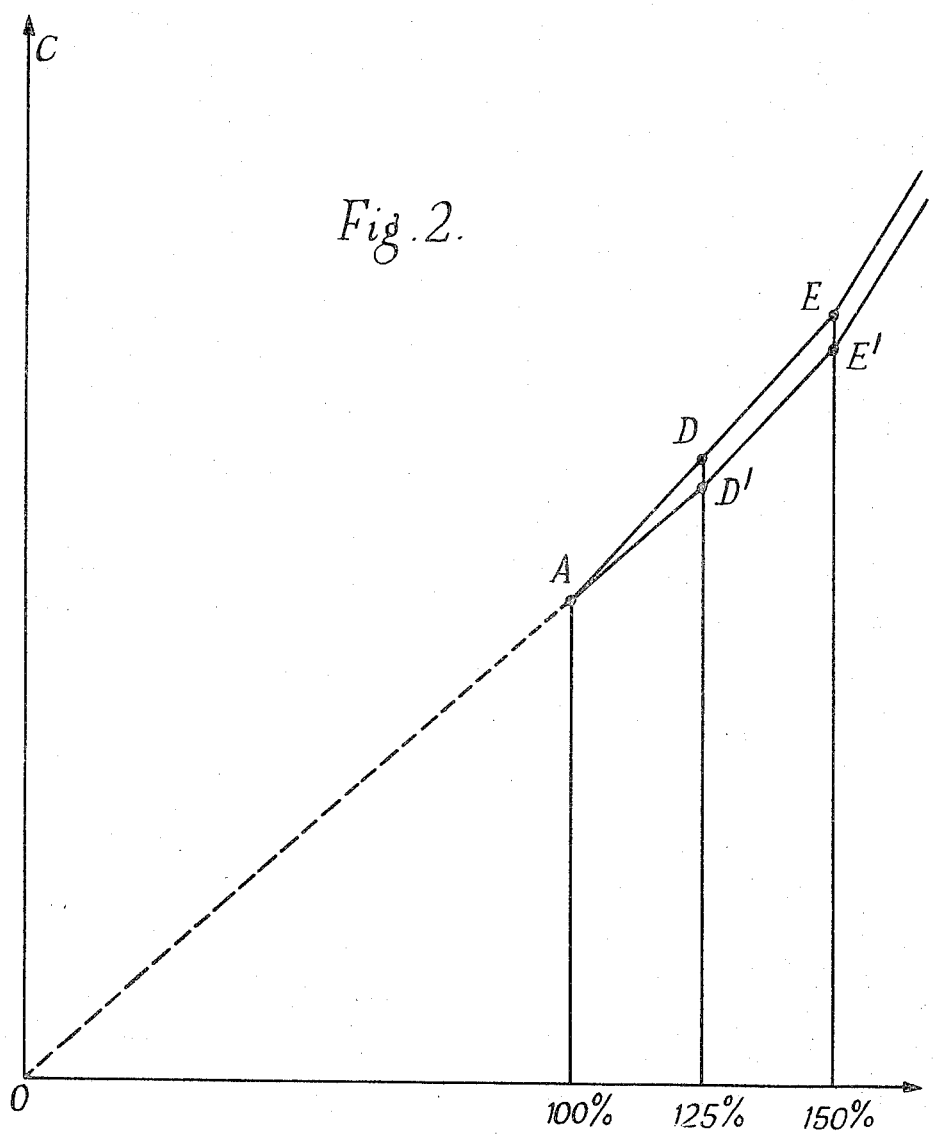
Figure 3:
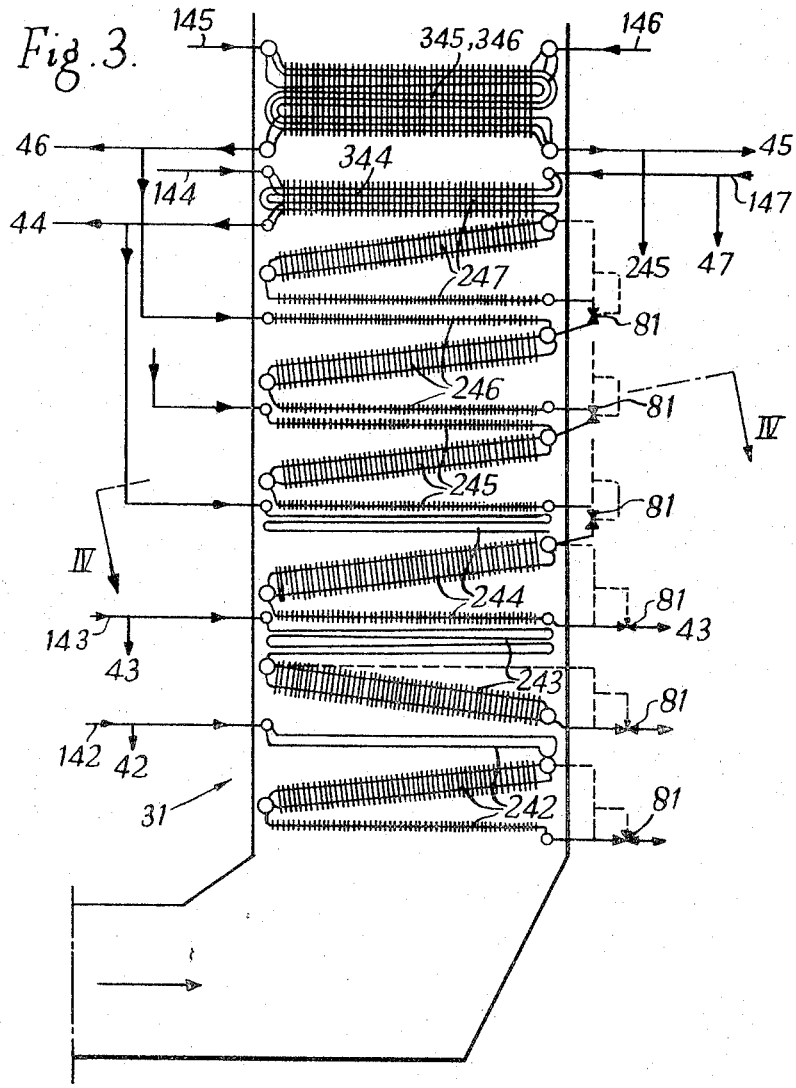
Figure 4:
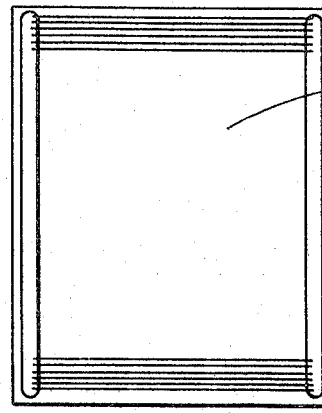
Figure 5:
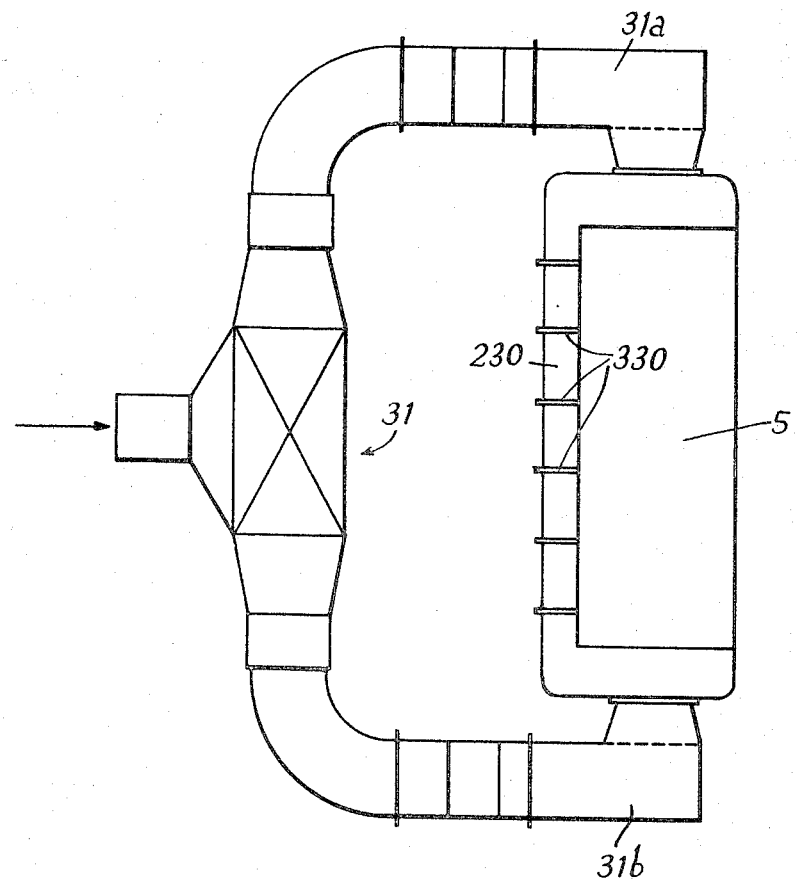

The invention will now be described by way of example with reference to the accompanying drawings in which FIGURE 1 represents schematically a steam turbine power plant with auxiliary gas turbine means, FIGURE 2 shows graphically relations between power production and fuel consumption, FIGURE 3 is a diagrammatic representation of an arrangement of steam-heated combustion air heaters in a combustion air duct, FIGURE 4 is a plan view of the arrangement of FIGURE 3 in section on the line IV—IV thereof, FIGURE 5 is a plan view of a combustion air duct arrangement and FIGURE 6 is a sectional side elevation of the steam generating unit of the power plant showing diagramatically some, but omitting others, of the elements thereof.

Referring to FIGURE 1 of the drawings, in a power plant a steam generating unit 1 is arranged to supply steam turbine means 2 with superheated and reheated steam and a gas turbine 3 is provided for intermittently supplementing the power of the power plant, for example, the gas turbine may be normally out of action but brought into use at peak loads.

The steam generating unit is of the kind with steam generating tubes 4 at the walls of a combustion chamber 5, arranged for the flow of water thereto under natural circulation from a steam and water drum 6 and for the flow of steam and water therefrom back to the drum, and with a steam superheater 7, a steam reheater 8 and an economizer 9 in the flow path of combustion gases from the combustion chamber. A steam pipe 10 leads steam from the drum 6 to the superheater 7. The steam turbine means 2 comprises a high pressure turbine 11 which is connected, by a steam pipe 12, to receive superheated steam from the superheater 7 and to pass partly expanded and cooled steam by a steam pipe 13 to the reheater 8 and a low pressure turbine 14 connected by a steam pipe 15 to receive reheated steam from the reheater 8 and to pass its exhaust steam to a condenser 21. The condensate water from the condenser provides feedwater for the steam generating unit and is pumped through water line 22 towards a water tank 47 and thence pumped through line 23 to the economizer 9 and thence to the drum 6.

The feedwater line 22 leads the water through a feedwater heater 41 and then divides into a branch 22a and a branch 22b, of which the branch 22a leads feedwater under control of a valve 24 in succession through a plurality of feedwater heaters 42 to 46. The feedwater heaters 41 to 46 are heat exchangers operating with the condensation of steam withdrawn through respective bled steam lines 141 to 146 from respective stages, of progressively high steam pressures and temperatures, of the low pressure turbine 14. A condensate path 25 leads from the heater 46 through the heater 45 and the heater 44 to the heater 43 which is constructed as a deaerator and in which withdrawn steam from the line 143 condenses in the feedwater and another condensate path 26 leads from the heater 42 through the heater 41 to the condenser 21.

The feedwater line 22b again divides into a branch 22c and a branch 22d, of which the branch 22c leads feedwater through a preeconomizer 27 arranged in the flow path of combustion gases which have left the economizer 9 and thence to the water tank 47. The tank 47 receives, through a bled steam line 147 leading from the steam pipe 13, steam withdrawn from the outlet of the high pressure turbine 11. If the tank 47 heated by bled steam were omitted, the water from the preeconomizer 27 could be taken to the deaerator 43.

The feedwater line 22d is arranged for leading feedwater, under control of a valve 28, through the tubes of a heat exchanger 29, which will be subsequently referred to, thence to the water tank 47.

The combustion chamber 5 of the steam generating unit 1 has firing means 30 which normally receive all their combustion air through an air duct 31 from an air compressor 32. The duct 31 leads the combustion air in series through a plurality of combustion air heaters 242 to 247 which are heat exchangers operating with the condensation of steam withdrawn from steam turbine stages in the respective steam lines 142 to 147. A condensate path 33 leads from the combustion air heaters 247 in succession through the air heaters 246, 245, 244 and 243 to the feedwater heater 43 and another condensate path 34 leads from the combustion air heater 242 to the feedwater heater 41.

The gas turbine 3 is arranged to be driven by the expansion of gases from a combustion chamber 61 of any suitable construction, which is arranged to receive combustion air from an air compressor 62 and fuel through means not shown. The exhaust gases from the gas turbine enter a gas duct 63 which leads into the air duct 31 behind, in the air flow path, the air heater 247 so that when the gas turbine is operated the gases therefrom flow along a length of the air duct leading to the firing means 30 together with combustion air that may be delivered by the compressor 32 and heated in the combustion air heaters. Leading from the gas duct 63 is a branch gas duct 64 through which turbine exhaust gases may, under control of a valve 65, flow through the heat exchanger 29 to pass heat to feedwater flowing through the tubes of said heat exchanger.

Leading from the air duct 31 at a position between the air compressor 32 and a valve 66 in the air duct ahead of the first air heater 242 is a branch duct 67 through which air from the compressor 32 may, under control of a valve 68 in the said branch duct, flow to the inlet to the compressor 62.

In the operation of the power plant, the gas turbine is normally not in use and all the combustion air for the firing means 30 of the steam generating unit is supplied by the compressor 32 delivering the air through the air heaters 242 to 247, the valve 66 being open and the valve 68 closed. The steam generating unit generates, superheats and reheats steam which is expanded and cooled in driving the steam turbine means. Most of the steam passes through all the steam turbine means and is condensed in the condenser 21 while some steam leaves steam turbine stages for regenerative feedwater heating in the heat exchangers 41 to 46 and tank 47; the valve 24 is normally fully open. Some of the feedwater may be heated in the preeconomizer 27 instead of in the feedwater heaters 41 to 46. The valve 65 in the gas duct 64 is closed as well as the valve 28 in the feedwater line 22d. The fuel and combustion air for the steam generating unit are varied as required to meet the load within the normal range of steam turbine powers.

When it is required to supplement the power production, the gas turbine 3 and air compressor 62 are started, the output of the compressor 32 is increased and the valve 68 in the air duct 67 is opened to a suitable extent and the combustion chamber 61 is fired with an air excess sufficient to limit sufficiently the gas temperature at the gas turbine. Together with air which passes the valve 66 in the air duct 31 and is heated in the combustion air heaters 242 to 247 the mixture of gaseous combustion products and heated air leaving the gas turbine passes to the firing means 30 of the steam generating unit. Thus said mixture supplies additional heat to the steam generating unit and the heat in said mixture that is lost to the power plant is limited to that rejected at the steam generating unit gas outlet.

The heat contributed by the gas turbine exhaust gas mixture to the combustion chamber 5 of the steam generating unit makes it useful to provide the preeconomizer 27 to abstract heat from the gases subsequent to the economizer 9. The feedwater to be heated therein is taken from a point in the feedwater connections where the temperature is high enough to preclude condensation from the gases on preeconomizer surfaces.

The use of the preeconomizer 27 reduces the amount of feedwater sent through the feedwater heaters 42 to 46 and therefore reduces the amount of steam bled from turbine stages in the withdrawn steam lines 142 to 146 and thus increases steam turbine power.

Since the exhaust gases from the gas turbine contain a large proportion of heated air, less air is required to be passed by the compressor 32 through the combustion air heaters 242 to 247 and the valve 66 in the air duct 31 is to be closed to a suitable extent. The reduction in the duty required by the air heaters 242 to 247 reduces the amount of steam bled from turbine stages in the withdrawn steam lines 142 to 147 and thus increases steam turbine power. Since the degree of opening of the valve 68 has an associated degree of closing of the valve 66, the two valves may be coupled so that as one is closed the other is opened while, moreover, the degree of opening of the valve 68 may be controlled simultaneously with the output of the compressor 32.

As the power production is increased in a lower excess power range by increasing the gas turbine power, a stage is reached, for example at 125% of normal load on the power plant, at which the valve 66 is fully closed and the full amount of air required for the fuel consumption in the steam generating unit comes from the gas turbine exhaust. As the power production is further increased in an upper excess power range by increasing the gas turbine power further, a suitable proportion of the gas turbine exhaust gases is permitted by a suitable degree of opening of the valve 65 in the gas duct 64 to leave the gas duct 63 and to pass through the heat exchanger 29, through which a suitable flow of feedwater is caused to flow by respectively opening and closing to suitable extents the valves 28 and 24. The feedwater heating in the heat exchanger 29 is accompanied by reduction in the feedwater heating in the feedwater heaters 42 to 46 and thus by reduction in the amount of steam bled from turbine stages in the withdrawn steam lines 142 to 146 and by increase in steam turbine power. The power plant efficiency is not, over the load range represented by the described further increase in gas turbine power, reduced by the same amount as if all the gas turbine exhaust gases had been led to the combustion chamber firing means 30.

The provision of the air duct 67, through which the air compressor 32 may increasingly feed the gas turbine compressor 62 as the requirement for air heating in the air heaters 242 to 247 falls in the lower excess power range, enables the said air compressor 32 to run, with advantage, under high load in said range. Throughout the total range comprising lower loads and both excess power ranges the compressor output is an increasing function of the power plant load.

Referring to the graphic curves of FIGURE 2, abscissae represent total plant power and ordinates the total fuel consumption. Point A represents the maximum normal power and fuel consumption when the gas turbine is not used and said power is given the designation 100%. As the total power is increased in the plant described by bringing into operation on the gas turbine in the manner described, the fuel consumption in the lower excess power range rises according to the line AD', which is a continuation of the line OA between the origin O and the point A, this circumstance indicating that the efficiency, if measured by power/fuel ratio, remains constant, as shown, up to a power of 125%. In a steam turbine-gas turbine power plant in which the gas turbine exhaust gases are used merely to heat part of the steam generator feed water, the fuel consumption will rise faster than according to the line AD', that is to say, by way of a line AD which represents an efficiency continuously falling with power increase, owing to heat loses in the gases rejected from the plant.

With further increase in plant power, with operation of the plant as described for the upper excess power range, heat losses in the gases rejected from the plant described rise, as power increases, in a similar manner as in the plant with which it is compared, both up to 150% power and at high rates beyond 150% power, but the efficiency as shown by line D'E' remains always higher than in the plant with which it is compared (line DE).

It may be advantageous to arrange in withdrawn steam lines, more particularly those in which the steam has high degrees of superheat, in the steam flows between the turbine means and the steam-condensing heat exchangers, heat exchangers operating with desuperheating of the withdrawn steam and arranged for combustion air heating. Referring to FIGURE 3 and 4, in part of the combustion air duct 31 in which the air flows upwardly, the air flows first through the air heater 242, comprising upper horizontal rows of tubes forming a desuperheating section thereof, rows of inclined gilled tubes forming a condensing section thereof and a lower horizontal row of tubes for condensate removal. The air then flows through the air heater 243, comprising upper horizontal rows of tubes forming a desuperheating section and rows of inclined gilled tubes forming a condensing section. The air next flows through air heater 244, comprising upper horizontal rows of tubes forming a desuperheating section, rows of inclined gilled tubes forming a condensing section and a lower horizontal row of tubes for condensate removal. The air next through the air heater 245, comprising an upper horizontal row of tubes forming a desuperheating section, rows of inclined gilled tubes forming a condensing section (the gills are omitted from FIGURE 4) and a lower horizontal row of tubes for condensate removal. The air next flows through the air heater 246 which is similar to the air heater 245. The air next flows through the air heater 247, comprising a plurality of upper horizontal rows of tubes forming a desuperheating section, rows of inclined gilled tubes forming a condensing section and a lower horizontal row of tubes for condensate removal. The tubes of the desuperheating section of the air heater 247 and the tubes, which are gilled, of a steam-desuperheating air heater 344 are interposed with one another. The air finally flows through two steam-desuperheating air heaters 345 and 346 the tubes of which are gilled and in horizontal rows and are interposed with one another.

Steam in the withdrawn steam line 142 pases partly to the feedwater heater 42 and partly to the steam-condensing air heater 242. Steam in the withdrawn steam line 143 passes partly to the feedwater heater 43 and partly to the steam-condensing air heater 243. Steam in the withdrawn steam line 144 passes through the steam-desuperheating air heater 344 and thence partly to the feedwater heater 44 and partly to the steam-condensing air heater 244. Steam in the withdrawn steam line 145 passes through the steam-desuperheating air heater 345 and thence partly to the feedwater heater 45 and partly to the steam-condensing air heater 245. Steam in the withdrawn steam line 146 passes through the steam-desuperheating air heater 346 and thence partly to the feedwater heater 46 and partly to the steam-condensing air heater 246. Steam in the withdrawn steam line 147 passes partly to the water tank 47 and partly to the steam-condensing air heater 247.

The rows of tubes of the various heat exchangers and sections thereof extend between appropriate headers. Each of the air heaters 247, 246, 244, 243, and 242 has a valve 81, operated in dependence upon the water level within the air heater, to control the condensate outflow therefrom; the condensate outflow from the air heater 247 is led into the air heater 246, that from the latter is led into the air heater 245, that from the latter is led into the air heater 244 and from the latter is led into the deaerator 43 (FIGURE 1) which also receives the condensate from the air heater 243. The condensate from the air heater 242 is led to the feedwater heater 41 (FIGURE 1).

The upwardly leading part, shown in FIGURES 3 and 4, of the combustion air duct 31 may, as shown in FIGURE 5, lead to branch ducts 31a and 31b to which gas ducts (not shown) from the gas turbine outlet may lead and which extend one to one side and the other to the other side of the combustion chamber 5 of the steam generating unit and deliver heated combustion air to the two sides of a windbox 230 of the firing means 30 which extends along the front of the combustion chamber and carries the air to burners 330. Referring to FIGURE 6, the combustion chamber 5 is shown with a hopper bottom 91 and in the gas flow path from the combustion chamber are shown in succession a secondary superheater 7b, a reheater 8, a primary superheater 7a, an economizer 9 and a preeconomizer 27; a recirculated gas duct 92 is arranged for the withdrawal of gases when desired from the gas flow path between the economizer 9 and the preeconomizer 27 by means of a compressor 93, which is arranged for the delivery of gases through a duct 94 to the hopper bottom 91 of the combustion chamber.

In a modification, turbine exhaust gases flowing through the heat exchanger 29 at high load may, instead of being immediately rejected, be led into the main combustion gas stream ahead of the preeconomizer 27 or the economizer 9.

We claim:
1. A power plant comprising steam turbine means, a fuel-fired steam generating unit for supplying steam thereto and air heating means operating by exchange of heat and using a heating medium drawn from said unit, and further comprising gas turbine means with air compressor means and a combustion chamber for intermittently supplementing the plant power production, with gaseous fluid connecting means, connecting said fuel-fired unit to a source of combustion air for circulating air in parallel through said air heating means and through said air compressor means, combustion chamber and gas turbine means.

2. A plant as claimed in claim 1, wherein the air heating means are arranged to use as heating medium steam withdrawn from the steam turbine.

3. A plant as claimed in claim 1, wherein said source of combustion air consists of one compressor.

4. A plant as claimed in claim 1, having air compressor means with a duct connected thereto and arranged for delivery, through said air heating means, of combustion air to the steam generating unit firing means and a duct arranged for delivering combustion air to the combustion chamber for the gas turbine means and further having means for regulating the distribution of combustion air between said two ducts.

5. A plant as claimed in claim 4, having further compressor means and wherein the said first-named air compressor means are arranged for delivering combustion air to the gas turbine means combustion chamber through said further compressor means.

6. A plant as claimed in claim 4, having a valve for controlling combustion air flow to the combustion air heating means and a valve controlling combustion air flow to the gas turbine means combustion chamber, said valves being coupled so that opening and closing of one valve is associated with closing and opening respectively of the other valve.

7. A plant as claimed in claim 6, wherein the degree of opening of the valve controlling combustion air flow to the gas turbine means combustion chamber is controlled simultaneously with the output of the air compressor means.

8. A plant as claimed in claim 1, wherein said air heating means comprise a plurality of heat exchangers receiving steam from respective stages of the steam turbine means and arranged for the flow of combustion air therethrough in series.

9. A plant as claimed in claim 8, having feedwater heaters and wherein means are provided for leading steam from a number of stages of the steam turbine means both to respective combustion air heaters and to respective said feedwater heaters arranged to heat feedwater of the steam generating unit.

10. A plant as claimed in claim 9, wherein the heaters operate with condensation of steam and steam from at least one of the said stages before reaching the combustion air and feedwater heaters passes through a combustion air heater operating with desuperheating of withdrawn steam.

11. A plant as claimed in claim 10, wherein means are provided for adding steam condensate from the combustion air heaters operating with condensation of steam to steam condensate from the feedwater heaters.

12. A plant as claimed in claim 9 further having economizer means and heat exchange means placed downsteam thereof in a combustion gas stream from the steam generating unit, with means for circulating streams of feedwater in parallel through said heat exchange means and through said feedwater heaters.

13. A plant as claimed in claim 12, having a vessel to which the two streams of feedwater join and from which feedwater is forwarded to the economizer means of the steam generating unit and the contents of said vessel are heated by the condensation therein of steam led from a stage of the steam turbine means.

14. A plant as claimed in claim 12, wherein a further feedwater heater is provided which is arranged for the controlled flow therethrough of a stream of feedwater in parallel with the heat exchange means situated downstream of the said economizer means in the said combustion gas stream and for the controlled flow therethrough of a stream of gaseous fluid from the gas turbine means additional to the flow of gaseous fluid from the gas turbine means to the firing means of the steam generating unit.

15. A plant as claimed in claim 14, wherein means are provided for increasing the feedwater flow through the said further feedwater heater by restricting the flow of feedwater through feedwater heaters operating with withdrawn steam condensation.

16. A plant as claimed in claim 1, wherein means are provided for withdrawing gaseous fluid from the gas turbine means in excess of the gaseous fluid that is sufficient to support combustion at the ring means of the steam generating unit when the latter is operating at its maximum steam raising capacity and means are provided for utilizing in the power plant heat in the excess gaseous fluid.

17. A plant as claimed in claim 16, wherein the means for utilizing in the power plant the heat in the excess gaseous fluid comprises a feedwater heater.

References Cited by the Examiner

UNITED STATES PATENTS 2,717,491   9/1955   Barr _____ 60—39.18

MARK NEWMAN, *Primary Examiner.*

RALPH D. BLAKESLEE, *Examiner.*